(12) United States Patent
Lindgren

(10) Patent No.: US 10,706,586 B2
(45) Date of Patent: Jul. 7, 2020

(54) VISION SYSTEM FOR A MOTOR VEHICLE AND METHOD OF CONTROLLING A VISION SYSTEM

(71) Applicant: VEONEER SWEDEN AB, Vargarda (SE)

(72) Inventor: Leif Lindgren, Linköping (SE)

(73) Assignee: VEONEER SWEDEN AB, Vargarda (SE)

( * ) Notice: Subject to any disclaimer, the term of this patent is extended or adjusted under 35 U.S.C. 154(b) by 89 days.

(21) Appl. No.: 15/755,751

(22) PCT Filed: Aug. 25, 2016

(86) PCT No.: PCT/EP2016/070120
§ 371 (c)(1),
(2) Date: Feb. 27, 2018

(87) PCT Pub. No.: WO2017/036927
PCT Pub. Date: Mar. 9, 2017

(65) Prior Publication Data
US 2018/0286076 A1    Oct. 4, 2018

(30) Foreign Application Priority Data
Sep. 1, 2015  (EP) ..................... 15183321

(51) Int. Cl.
*G06T 7/77*   (2017.01)
*G06T 7/80*   (2017.01)
(Continued)

(52) U.S. Cl.
CPC ............ *G06T 7/77* (2017.01); *G06K 9/00791* (2013.01); *G06T 7/50* (2017.01); *G06T 7/85* (2017.01); *G06T 2207/30252* (2013.01)

(58) Field of Classification Search
None
See application file for complete search history.

(56) References Cited

U.S. PATENT DOCUMENTS 8,300,886 B2   10/2012   Hoffmann
8,855,370 B2   10/2014   Hoffmann
(Continued)

FOREIGN PATENT DOCUMENTS

DE   2012 009 577 A1   11/2012
EP   2 579 231 A       4/2013
(Continued)

OTHER PUBLICATIONS

International Search Report and Written Opinion of PCT/EP2016/070120, dated Dec. 8, 2016.

*Primary Examiner* — Leon Viet Q Nguyen
(74) *Attorney, Agent, or Firm* — Dickinson Wright PLLC

(57) ABSTRACT

A motor vehicle vision system (10) including a stereo imaging system (11) and a data processing device (14) establishing an object detector (15) to detect an object and a tracker (16). The data processing device (14) calculates a size related value and a disparity related value for the object. An analysis section (20) performs an analysis on a group of at least five data points corresponding to different times, each data point includes a size related value and a disparity related value. The analysis uses predetermined regression function having at least one variable, and yields a best value for each variable corresponding to a best match of the regression function to the data points. The analysis section (20) calculates from a best value a systematic error in the disparity related values and/or in the size related values.

15 Claims, 3 Drawing Sheets

(51) Int. Cl.
    *G06T 7/50*     (2017.01)
    *G06K 9/00*     (2006.01)

(56) References Cited

U.S. PATENT DOCUMENTS

| | | |
|---|---|---|
| 2008/0144924 A1 | 6/2008 | Hoffmann |
| 2012/0105585 A1* | 5/2012 | Masalkar ............... G06F 3/017 348/46 |
| 2013/0021451 A1 | 1/2013 | Hoffmann |
| 2013/0088578 A1 | 4/2013 | Umezawa et al. |
| 2013/0163821 A1* | 6/2013 | You ................... G06K 9/00208 382/104 |
| 2014/0168377 A1* | 6/2014 | Cluff ................... H04N 13/246 348/47 |
| 2015/0210274 A1 | 7/2015 | Clarke et al. |

FOREIGN PATENT DOCUMENTS

| | | |
|---|---|---|
| JP | 2012-027035 A | 2/2012 |
| JP | 2013-093013 A | 5/2013 |

\* cited by examiner

VISION SYSTEM FOR A MOTOR VEHICLE AND METHOD OF CONTROLLING A VISION SYSTEM

CROSS-REFERENCE TO RELATED APPLICATIONS

This application is a 35 U.S.C. § 371 national phase application of PCT International Application No. PCT/EP2016/070120, filed Aug. 25, 2016, which claims the benefit of priority under 35 U.S.C. § 119 to European Patent Application No. 15183321.7, filed Sep. 1, 2015, the contents of which are incorporated herein by reference in their entirety.

FIELD OF THE INVENTION

The invention relates to a vision system for a motor vehicle, having a pair of imaging devices forming a stereo imaging system and an data processing device establishing an object detector adapted to detect objects in images captured by the imaging system, a tracker adapted to track over time objects detected by the object detector, wherein the data processing device is adapted to calculate a size related value and a disparity related value of the detected and tracked object. The invention also relates to a method of controlling a vision system.

BACKGROUND

The squint angle, also known as yaw angle, between the left camera and the right camera in a stereo camera system, must be determined with great accuracy, because an error in this angle results in large distance estimation errors in the stereo calculations. The distance error grows with the square of the distance. For example, for a 160 mm baseline stereo camera, a squint angle error as low as 0.01° gives a distance estimation error of around 10 m at a distance of 100 m. For an automotive stereo camera the squint angle will not be constant over the vehicle life time due to thermal changes and the long life time of automotive systems. Therefore, an online solution for estimating a squint angle error is needed.

It is known to estimate the squint angle error using radar or lidar distance information as a reference value, which however requires a radar or lidar reference system.

DE 10 2012 009 577 A1 describes a method of calibrating the squint angle between two stereo cameras in a motor vehicle from a comparison of a reference driven distance determined from odometric data to a stereoscopic driven distance determined by image processing. However, the external odometric data needed to calculate the reference driven distance constitute an additional systematic source of uncertainty for the determination of the squint angle error.

US 2014/0168377 A1 discloses a method for aligning a stereo camera of a vehicle mounted object detection system, wherein an image from each camera at two different times is used to determine an observed displacement of a stationary object, like a traffic sign, relative to the vehicle. A predicted displacement of the object relative to the vehicle is also determined using, for example, a difference of size of the object in images taken at two different times. Determining a triangulation correction based on a difference of the observed displacement and the predicted displacement is used to correct for misalignment of the cameras.

An object of the present invention is to provide a vision system and a method of controlling a vision system which allow for an accurate determination of a squint angle error between the stereo cameras during operation of a motor vehicle.

An embodiment of the invention solves this object with the features described in the specification and shown by the appended drawings. According to an embodiment, a regression analysis using a predetermined regression function having at least one variable is performed on a group of at least five data points of the tracked object corresponding to different times. Herein, each data point establishes a size related value and a corresponding, i.e. same-time, disparity related value of the detected object. The regression analysis yields a best value for each variable corresponding to a best match or fit of the regression function to the group of data points. A systematic error in the disparity related values and/or in the size related values is calculated from the at least one best value. This systematic error can provide a measure for the squint angle error, derived from the image data taken by the imaging system, only, without any reference to external information like external odometric data, ego vehicle speed, or radar or lidar information.

An embodiment of the invention uses size information from objects in the image that are tracked over time. The size information of an object together with the calculated stereo information (disparity or disparity related information) of the corresponding object is used to estimate the squint angle error, or a systematic error unambiguously related to it.

If the value of the squint angle error is explicitly required, the determined systematic error in the disparity related values and/or the size related values into a squint angle error can easily be converted to the squint angle error using the known optical parameters of the imaging system.

In comparison to the prior art described for example in US 2014/0168377 A1, the invention yields a much more accurate measure of the squint or yaw angle error since it is based on not only two data points, but on at least five data points, preferably at least ten data points.

Furthermore, the invention is not limited to the investigation of stationary objects. Preferably the tracked object used in the regression analysis is another vehicle which may be a moving vehicle, in particular an oncoming vehicle. Other objects than vehicles may be used in the regression analysis.

Preferably the regression analysis is a linear regression analysis. In a preferred embodiment, the regression function is a straight line. Here, the following facts are advantageously used: 1) For a perfect squint angle (zero squint angle error) the width of an object and the disparity are both zero at infinite distance; and 2) For a perfect squint angle the width doubles when the distance is halved. In particular, if the disparity related values are disparity values and the size related values are size values, the ideal relationship is a straight line. In this case, the systematic error in the disparity related values and/or the size related values can easily be determined as an offset of the regression function to the origin, i.e. zero disparity and zero size.

Preferably the regression analysis is performed step by step, i.e. finding the best value of a first variable of the regression function, then finding the best value of a second variable of the regression function, and so on. This may be more effective than performing the regression analysis for all variables simultaneously in a multi-variable regression, which may be too computationally demanding given the limited processing capabilities in a motor vehicle.

In particular, if the regression function is a straight line, the regression analysis preferably includes a first regression step of finding the best slope of the straight line regression function, and a second regression step of finding the best offset of the straight line regression function while keeping the slope fixed to the best slope established in the first regression step.

Since the slope of the straight line is determined by the absolute size of the tracked object, the step of finding the best slope of the straight line regression function can advantageously be dispensed with if the absolute size of the tracked object is known from other sources, for example through inter-vehicle communication, or from image processing. In that case, the regression analysis preferably reduces to a cost-saving single variable regression analysis of finding the best offset of the straight line regression function.

The data points used in the regression analysis are preferably spanned over a range corresponding to a distance range of at least 30 m, more preferably at least 50 m, even more preferably at least 70 m. Generally, the precision in the determination of the systematic error can be higher if the distance range of the data points taken into account in the regression analysis is larger. Nevertheless, preferably data points corresponding to an object distance of less than a predetermined value, which advantageously may be in the range of 5 m to 35 m, preferably 10 m to 30 m, more preferably 15 m to 25 m, for example 20 m, can be discarded in the regression analysis, since data points corresponding to a relatively close distance to the tracked object show increasing deviations of other origin predominating over the deviation due to a squint angle error.

In a preferred embodiment, the disparity related values are disparity values. In another embodiment, the disparity related values can be for example distance values. Preferably the size related values are object sizes, in particular object widths. In another embodiment, the size related values can be for example object heights.

Preferably, the regression results from several tracked vehicles are combined to yield a more stable and accurate systematic error value.

BRIEF DESCRIPTION OF THE DRAWINGS

In the following the invention shall be illustrated on the basis of preferred embodiments with reference to the accompanying drawings, wherein.

DETAILED DESCRIPTION

Figure 1:
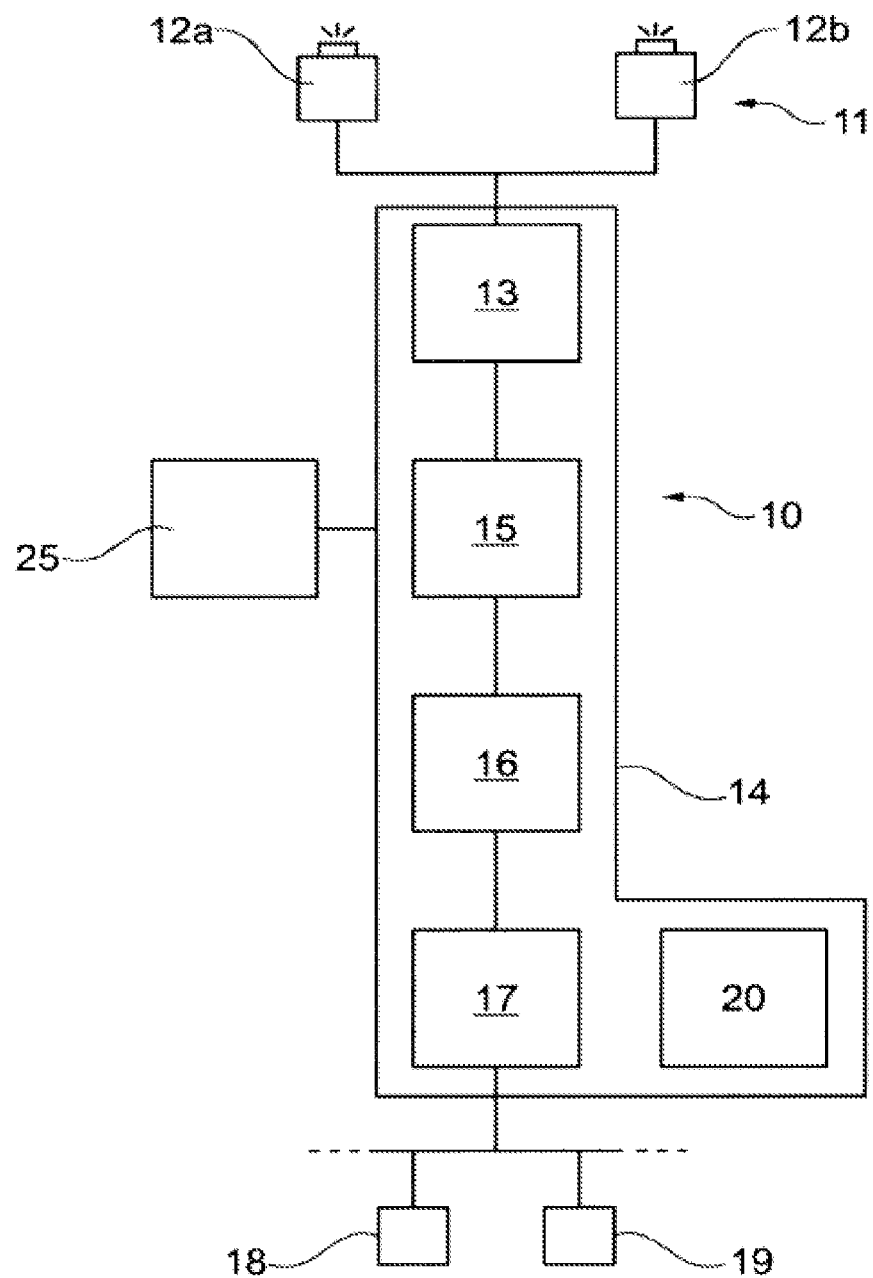
FIG. 1 shows a schematic drawing of a vision system in a motor vehicle.

The vision system 10 is mounted in a motor vehicle and includes an imaging system 11 for acquiring images of a region surrounding the motor vehicle, for example a region in front of the motor vehicle. The imaging system 11 includes two optical imaging devices 12a, 12b, for example cameras, forming stereo imaging system 11 and preferably operating in the visible and/or infrared wavelength range, where infrared covers near IR with wavelengths below 5 microns and/or far IR with wavelengths beyond 5 microns.

The imaging system 11 is coupled to a data processing device 14 for data processing of the image data received from the imaging system 11. The data processing device 14 advantageously includes a pre-processing section 13 adapted to control the capture of images by the imaging system 11, receive the electrical signal containing the image information from the imaging system 11, warp pairs of left/right images into alignment and/or create disparity images, which per se is known in the art. The image pre-processing section 13 may be realized by a dedicated hardware circuit, for example a Field Programmable Gate Array (FPGA). Alternatively the pre-processing section 13, or part of its functions, can be realized in a microprocessor.

Further image and data processing is carried out in the data processing device 14 by corresponding software. In particular, the data processing device 14 includes an object detection section 15 adapted to identify and preferably also classify possible objects in front of the motor vehicle, such as pedestrians, other vehicles, bicyclists and/or large animals, a tracking section 16 adapted to track over time the position of object candidates in the recorded images identified by the object detection section 15, and an estimation and decision section 17 adapted to estimate a collision probability of a tracked object and to activate or control at least one driver assistance device 18, 19 depending on the estimated collision probability. The driver assistance device 18 may in particular include a display device 18 for displaying information relating to a detected object. However, the invention is not limited to a display device 18. The driver assistance device 18, 19 may in addition or alternatively include a warning system adapted to provide a collision warning to the driver by suitable optical, acoustical and/or haptic warning signals; one or more restraint systems such as occupant airbags or safety belt tensioners, pedestrian airbags, hood lifters and the like; and/or dynamic vehicle control systems such as brakes or steering system. The data processing device 14 has access to a memory device 25.

The data processing device 14 is preferably a digital device which is programmed or programmable and expediently includes a microprocessor, micro-controller or a digital signal processor (DSP). The data processing device 14 and the memory device 25 are preferably realised in an on-board electronic control unit (ECU) and may be connected to the imaging system 11 via a separate cable or a vehicle data bus. In another embodiment the ECU and one or more of the imaging devices 12 can be integrated into a single unit, where a one box solution including the ECU and all imaging devices 12 can be preferred. All steps from imaging, image pre-processing, image processing to possible activation or control of driver assistance device 18, and/or regression analysis are performed automatically and continuously during driving in real time.

According to the invention, the data processing device 14 includes an analysis section 20. In the following a regression analysis performed in the analysis section 20 is described in detail.

For a regression analysis to be performed, the analysis section 20 requires at least five, preferably at least ten, more preferably at least twenty, and even more preferably at least thirty data points. Here, each data point has been extracted from a different image, or image frame, of one and the same object detected by the object detection section 15 and tracked by the tracking section 16. The object used for the regression analysis preferably is an (oncoming and/or preceding) other motor vehicle. Each data point preferably consists of two associated values (double or 2-tuple), namely a disparity related value and a corresponding size related values, where both values of a data point are calculated from one and the same image frame. The data points of a detected and tracked object may be stored in the memory 25 for later usage by the analysis section 20.

Figure 2:
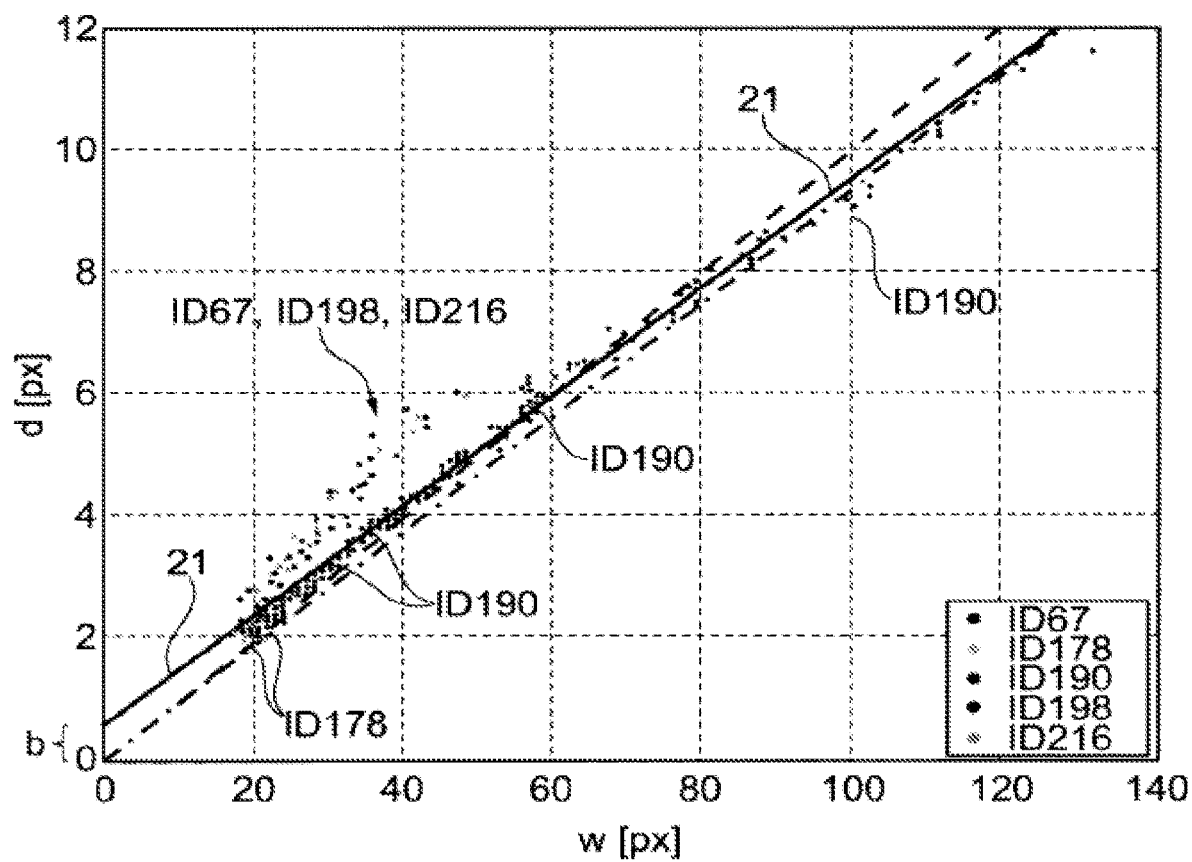
FIG. 2 shows a disparity over width diagram illustrating the regression analysis in a first inventive embodiment.

A practical example of a regression analysis in a preferred embodiment is shown in FIG. 2. Here, a plurality of data points of five different vehicles (ID67, ID178, ID190, ID198, ID216) detected by the object detection section 15 in the images taken by the imaging system are shown. In this embodiment, the disparity related value is the disparity of the detected other vehicle, and the size related value is the width of the detected other vehicle. Image processing methods to determine the width (generally, a size) and the disparity of a detected other vehicle are known to the skilled person and will not be described here. Generally, for each image an object width in pixels is determined for example in the object detection section 15 and a corresponding disparity value is obtained from the stereo calculation, for example in the pre-processing section 13. In this application, the disparity is defined as usual as the focal length in pixel times the baseline of the stereo imaging system divided by the distance to the object.

In the diagram shown in FIG. 2, the x-axis denotes the width w of the other vehicles in pixels, and the y-axis denotes the disparity d of the other vehicles in pixels. It should be understood that the graphical representation of the data points and lines shown in FIG. 2 is for better understanding only; in the on-board vision system 10 of the vehicle, only the data points themselves are stored and processed.

In FIG. 2, data points for five different detected and tracked other vehicles are shown. For the vehicle with ID178, only a few data points around a vehicle width of 20 pixels corresponding to a distance of roughly 100 m are available. For the vehicles with ID67, ID198, ID216 a plurality of data points are available in the width range between 20 pixels and 50 pixels, corresponding to a vehicle distance of roughly 35 m to 100 m. In the following regression analysis, the data points of the vehicles with ID67, ID178, ID198, ID216 are discarded.

The data points of the other vehicle with ID190 include at least ten values in a distance range between 20 m and 100 m and span a width range between 20 pixels and 130 pixels corresponding to a vehicle distance between about 15 m and about 100 m, i.e., more than 70 m. On the basis of one or more of the above criteria and/or other suited criteria, the analysis section 20 determines the data set of the vehicle with ID190 to be well suited for a regression analysis.

Before starting the fitting of a regression function, a subset of all the available data points of the detected and tracked object can be chosen, such that data points corresponding to an object distance of less than a predetermined threshold value, or an object width above a pre-determined threshold value, are discarded. In the present case, data points corresponding to an object width of more than 80 pixels or an object distance of less than 20 m are discarded, since it has been shown that data points in the large width region show large variations for other reasons than squint angle error.

The regression analysis includes fitting a straight line to the data points of the vehicle with ID190. Since a straight line is determined by two variables, namely the slope and an offset, this can be done by a two-variable regression analysis which yields the best values for the two variables simultaneously. Preferably, however, the regression analysis is performed in several single-variable regression steps, where each regression step yields one best value for a variable; i.e., the best value for the parameters are obtained one after the other.

In the present case, in particular, the regression analysis preferably includes a first regression step of finding the best slope of the straight line regression function, and a second regression step of finding the best offset of the straight line regression function while keeping the slope fixed to the best slope established in the first regression step.

The first regression step of finding the best slope of the straight line regression function can be performed in any suited manner. In a preferred embodiment, pairs of data points are connected by straight lines and an average or median value of the individual slopes of these straight lines is taken as the best value for the slope of the regression straight line.

In the second step, a straight line with slope fixed to the best value from the first step is shifted along the data points until a cost function, for example the squared error, becomes minimum. For the second step, preferably, a subset of the data points used in the first step can be chosen, such that data points having a width above a pre-determined threshold are preferably discarded. In the present case, data points having a width of more than 50 pixels corresponding to a distance of less than 35 m are discarded for the second step.

The resulting best-fit straight line regression function 21 is shown in the diagram in FIG. 2. If the best-fit straight line regression function 21 is expressed as $y=a \cdot x+b$, the y-offset b of the best-fit regression function corresponds to the distance of the intersection of the best-fit straight line regression function 21 with the y-axis to the origin (0,0). It should be understood that in the on-board vision system 10, the offset b is not graphically determined as described above, but the offset b is directly taken from the regression analysis.

The determined offset b is a measure of the squint angle error. The analysis section 20 may convert the systematic disparity error b into a squint angle error in degree, radiant or any other suited unit, but this is not mandatory, as it is possible to work directly with the disparity error b.

Preferably, systematic error values b from a regression analysis of not only one vehicle (here ID190) is used, but the regression results from several tracked vehicles are preferably combined over time, for example using a filter, in order to increase the stability and accuracy of the error determination.

Based on the determined disparity error b, suited actions may be taken by the data processing device 14. In particular, the determined disparity error b, or a squint angle error derived from it, may be used in the pre-processing section 13 in order to correct the image data from the imaging system 11 for the squint angle error. Other applications of the determined disparity error b are possible.

Other values than the disparity error b also provide a measure of the squint angle error. For example, in the example illustrated in FIG. 2, the absolute distance of the intersection of the best-fit straight line regression function 21 with the x-axis yields the width error b/a, which may be considered instead of b. In general, any error value which is unambiguously related to the squint angle error can be used.

Other object size related values can be used instead of object widths, for example object heights, the object area, or the root of an object area.

Figure 3:
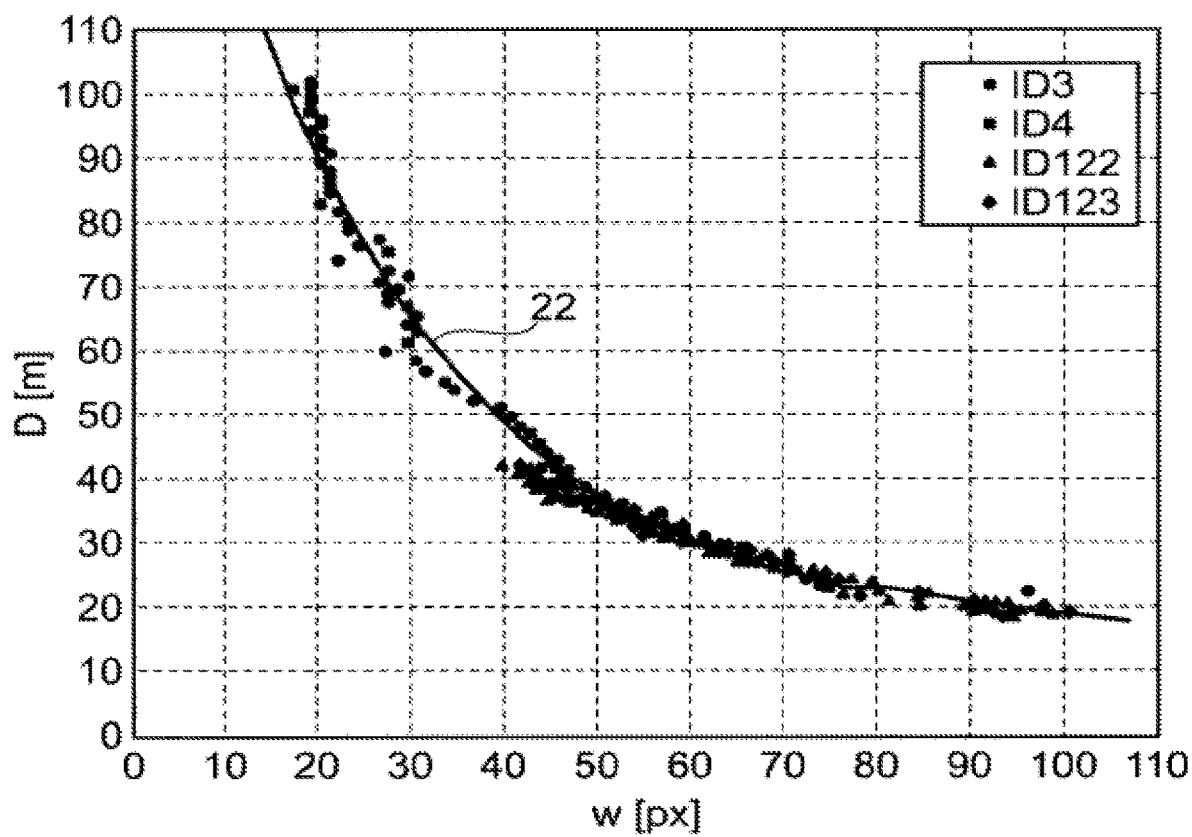
FIG. 3 shows a distance over width diagram illustrating the regression analysis in a second inventive embodiment.

In the diagram shown in FIG. 3, the x-axis denotes the width w of the other vehicles in pixels, whereas the y-axis denotes the distance D of the other vehicles in meters. This exemplifies that the disparity related values of the invention do not have to be disparities, but can be any magnitude which is unambiguously related to the disparity of the detected objects, like, for example, the distances D. It is evident from FIG. 3 that the functional relationship of distance versus width is not a straight line. Therefore, an adequate regression function 22 like a hyperbolic function y=1/(a·x+b) is used in the regression analysis in the embodiment of FIG. 3, where b is a measure of the squint angle error.

In addition to the squint angle error, the regression analysis can also yield a confidence value for the squint angle error, based on one or more different weight functions like number of data points used, mean vehicle width, and so on.

While the above description constitutes the preferred embodiment of the present invention, it will be appreciated that the invention is susceptible to modification, variation and change without departing from the proper scope and fair meaning of the accompanying claims.

The invention claimed is:

1. A vision system for a motor vehicle comprising, a pair of imaging devices forming a stereo imaging system and a data processing device establishing an object detector adapted to detect an object in a surrounding of the motor vehicle from one or more images captured by the imaging system, a tracker adapted to track over time the object detected by the object detector, wherein the data processing device is adapted to calculate a size related value and a disparity related value of the object, the data processing device comprises an analysis section adapted to perform an analysis on a group of at least five data points of the object corresponding to different times, wherein each data point comprises a size related value and a corresponding disparity related value of the object, wherein the analysis is a regression analysis using a predetermined regression function having at least one variable, wherein the regression analysis yields a best value for each of the at least one variable corresponding to a best match of the regression function to the group of data points, wherein the analysis section is adapted to calculate from the at least one best value a systematic error in the disparity related values or in the size related values, the object used in the regression analysis is another vehicle.

2. The vision system as claimed in claim 1, further comprising, the disparity related value is one or more disparity values.

3. The vision system as claimed in claim 1, further comprising, the disparity related value is one or more distance values.

4. The vision system as claimed in claim 1, further comprising, the size related value is one or more object sizes.

5. The vision system as claimed in claim 1, further comprising, the regression analysis is a linear regression analysis.

6. The vision system as claimed in claim 5, further comprising, the regression function of the regression analysis is a straight line.

7. The vision system as claimed in claim 1, further comprising, an error in the disparity related values is calculated as a disparity offset of the regression function.

8. The vision system as claimed in claim 1, further comprising, at least ten data points of the object at different times are used in the regression analysis.

9. The vision system as claimed in claim 4, further comprising, in that the size related value is an object width.

10. A vision system for a motor vehicle comprising, a pair of imaging devices forming a stereo imaging system and a data processing device establishing an object detector adapted to detect an object in a surrounding of the motor vehicle from one or more images captured by the imaging system, a tracker adapted to track over time the object detected by the object detector, wherein the data processing device is adapted to calculate a size related value and a disparity related value of the object, the data processing device comprises an analysis section adapted to perform an analysis on a group of at least five data points of the object corresponding to different times, wherein each data point comprises a size related value and a corresponding disparity related value of the object, wherein the analysis is a regression analysis using a predetermined regression function having at least one variable, wherein the regression analysis yields a best value for each of the at least one variable corresponding to a best match of the regression function to the group of data points, wherein the analysis section is adapted to calculate from the at least one best value a systematic error in the disparity related values or in the size related values the regression analysis comprises a linear regression analysis with a first regression step of finding the best slope of a linear regression function as a straight line regression function, and a second regression step of finding the best offset of the straight line regression function while keeping the slope fixed to the best slope established in the first regression step.

11. A vision system for a motor vehicle comprising, a pair of imaging devices forming a stereo imaging system and a data processing device establishing an object detector adapted to detect an object in a surrounding of the motor vehicle from one or more images captured by the imaging system, a tracker adapted to track over time the object by the object detector, wherein the data processing device is adapted to calculate a size related value and a disparity related value of the object, the data processing device comprises an analysis section adapted to perform an analysis on a group of at least five data points of the object corresponding to different times, wherein each data point comprises a size related value and a corresponding disparity related value of the object, wherein the analysis is a regression analysis using a predetermined regression function having at least one variable, wherein the regression analysis yields a best value for each of the at least one variable corresponding to a best match of the regression function to the group of data points, wherein the analysis section is adapted to calculate from the at least one best value a systematic error in the disparity related values or in the size related values, the data points used in the regression analysis span a distance range of at least 30 m or at least ten values in the distance range between 20 m and 100 m.

12. The vision system as claimed in claim 11, further comprising, the object used in the regression analysis is another vehicle.

13. A vision system for a motor vehicle comprising, a pair of imaging devices forming a stereo imaging system and a data processing device establishing an object detector adapted to detect an object in a surrounding of the motor vehicle from one or more images captured by the imaging system, a tracker adapted to track over time the object by the object detector, wherein the data processing device is adapted to calculate a size related value and a disparity related value of the object, the data processing device comprises an analysis section adapted to perform an analysis on a group of at least five data points of the object corresponding to different times, wherein each data point comprises a size related value and a corresponding disparity related value of the object, wherein the analysis is a regression analysis using a predetermined regression function having at least one variable, wherein the regression analysis yields a best value for each of the at least one variable corresponding to a best match of the regression function to the group of data points, wherein the analysis section is adapted to calculate from the at least one best value a systematic error in the disparity related values or in the size related values, the data points corresponding to an object distance of less than a predetermined value are discarded in the regression analysis.

14. A vision system for a motor vehicle comprising, a pair of imaging devices forming a stereo imaging system and a data processing device establishing an object detector adapted to detect an object in a surrounding of the motor vehicle from one or more images captured by the imaging system, a tracker adapted to track over time the object by the object detector, wherein the data processing device is adapted to calculate a size related value and a disparity related value of the object, the data processing device comprises an analysis section adapted to perform an analysis on a group of at least five data points of the object corresponding to different times, wherein each data point comprises a size related value and a corresponding disparity related value of the object, wherein the analysis is a regression analysis using a predetermined regression function having at least one variable, wherein the regression analysis yields a best value for each of the at least one variable corresponding to a best match of the regression function to the group of data points, wherein the analysis section is adapted to calculate from the at least one best value a systematic error in the disparity related values or in the size related values, the data processing device is adapted to convert the systematic error in the disparity related values or the size related values into a squint angle error.

15. A vision system for a motor vehicle comprising, a pair of imaging devices forming a stereo imaging system and a data processing device establishing an object detector adapted to detect an object in a surrounding of the motor vehicle from one or more images captured by the imaging system, a tracker adapted to track over time the object detected by the object detector, wherein the data processing device is adapted to calculate a size related value and a disparity related value of the object, the data processing device comprises an analysis section adapted to perform an analysis on a group of at least five data points of the object corresponding to different times, wherein each data point comprises a size related value and a corresponding disparity related value of the object, wherein the analysis is a regression analysis using a predetermined regression function having at least one variable, wherein the regression analysis yields a best value for each of the at least one variable corresponding to a best match of the regression function to the group of data points, wherein the analysis section is adapted to calculate from the at least one best value a systematic error in the disparity related values or in the size related values, the regression analysis results from several of the objects are combined to yield a more accurate valve of the systematic error.

* * * * *